UNITED STATES PATENT OFFICE.

MOSES H. DAY, OF BROOKLINE, MASSACHUSETTS.

COMBUSTIBLE SUBSTANCE.

SPECIFICATION forming part of Letters Patent No. 406,339, dated July 2, 1889.

Application filed March 12, 1888. Serial No. 267,035. (No specimens.)

*To all whom it may concern:*

Be it known that I, MOSES H. DAY, a citizen of the United States, residing at Brookline, in the county of Norfolk and State of Massachusetts, have invented certain Improvements in Combustible Substances, of which the following is a specification.

The invention relates to a combustible substance consisting of a base (which may be any well-known merchantable fuel) impregnated with a suitable chemical salt, which, when acted upon by fire, in the destruction of the base by fire, will give a distinctive color to the flame produced, and differing from that of the flame, which would be incidental to the burning of the base if not treated with the salt.

In carrying out my invention I prefer to treat the base in the following manner: The base—such as wood, coal, coke, &c.—is placed in an air-tight iron vessel, the interior of which is coated with coal-tar. The air having been exhausted, a solution of the desired salt is allowed to enter the vessel and to remain therein until the base shall have been sufficiently saturated. The same results may be obtained by allowing the base to remain in a cold solution of the salt for a period of some days. The substance is then subjected to artificial or other heat, in order that the water or solvent may be expelled from it, the particles of the salt, in a crystalline or anhydrous state, having been incorporated with or admitted to the fibers, pores, or interstices of the base.

The density of the solution must be such as will deposit a quantity of salt in the base sufficient during the process of combustion to change the color of the flame attendant upon the burning of the base when not treated with the salt. Flames of different hues and very striking and beautiful effects may be produced by thus impregnating the base with any of the various chemical salts, which, when burning, give out colored flames. The intensity of the color of the flame may be increased or diminished by the use of a greater or less amount of the salt.

Among the salts which may be used for giving flames of different colors are the following, the color produced by burning each being named: Sodic chloride, yellow; sodic biborate, green; potassic chlorate, violet; calcic chloride, orange; calcic carbonate, rose; lithium chloride, purple; baric chloride, pale green; strontium chloride, crimson; strontium nitrate, bright crimson; cupric chloride, bluish green; cupric nitrate, emerald green; cupric sulphate, pale green.

Flames of other colors may be obtained by using various other salts or combinations of salts.

I disclaim substances impregnated with solutions of salts for the purpose of rendering them indestructible and less liable to decay; as, also, in pyrotechnics, rapidly burning substances for producing colored flames; but, Having described my invention, I claim—

A combustible substance consisting of a base of ordinary merchantable fuel impregnated with a chemical salt in a crystalline or anhydrous state, which, when acted upon by fire, in the destruction of the base by fire, will give a distinctive color to the flame produced, substantially as set forth.

MOSES H. DAY.

Witnesses:
JOHN F. WING,
GEO. LAMB.